United States Patent
Boyadjiev et al.

(10) Patent No.: US 9,756,067 B2
(45) Date of Patent: Sep. 5, 2017

(54) NETWORK SECURITY

(71) Applicant: Accenture Global Services Limited, Dublin (IE)

(72) Inventors: Constantine Boyadjiev, Jersey City, NJ (US); Joshua Patterson, Baltimore, MD (US); Paul J. Mahler, San Francisco, CA (US); Michael E. Wendt, Alexandria, VA (US)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 122 days.

(21) Appl. No.: 14/822,547

(22) Filed: Aug. 10, 2015

(65) Prior Publication Data

US 2017/0048270 A1 Feb. 16, 2017

(51) Int. Cl.
*H04L 29/06* (2006.01)
*G06F 17/30* (2006.01)
*H04L 12/44* (2006.01)

(52) U.S. Cl.
CPC .... *H04L 63/1441* (2013.01); *G06F 17/30675* (2013.01); *G06F 17/30958* (2013.01); *G06F 17/30961* (2013.01); *H04L 12/44* (2013.01); *H04L 63/1425* (2013.01)

(58) Field of Classification Search
CPC . H04L 63/1441; H04L 12/44; H04L 63/1425; G06F 17/30675; G06F 17/30958; G06F 17/30961
See application file for complete search history.

(56) References Cited

U.S. PATENT DOCUMENTS

| | | | |
|---|---|---|---|
| 6,563,521 B1 * | 5/2003 | Perttunen | G06F 17/30961 707/999.202 |
| 9,065,727 B1 * | 6/2015 | Liu | H04L 43/04 |
| 9,112,895 B1 * | 8/2015 | Lin | H04L 63/1416 |
| 9,128,995 B1 * | 9/2015 | Fletcher | G06F 17/30572 |
| 9,253,034 B1 * | 2/2016 | Krishnamurthy | H04L 41/0843 |
| 9,378,361 B1 * | 6/2016 | Yen | G06F 21/55 |
| 9,516,052 B1 * | 12/2016 | Chauhan | H04L 63/1425 |
| 2005/0203881 A1 * | 9/2005 | Sakamoto | G06F 21/552 |
| 2007/0150949 A1 | 6/2007 | Futamura et al. | |
| 2015/0007314 A1 | 1/2015 | Vaughan | |
| 2015/0381646 A1 * | 12/2015 | Lin | H04L 63/1416 726/23 |
| 2016/0065428 A1 * | 3/2016 | Srivastava | H04L 43/065 370/242 |
| 2016/0241578 A1 * | 8/2016 | Mahler | H04L 63/1425 |
| 2016/0373476 A1 * | 12/2016 | Dell'Anno | G06F 17/30563 |
| 2017/0031565 A1 * | 2/2017 | Chauhan | G06F 3/04842 |

FOREIGN PATENT DOCUMENTS

WO  2008/011576  1/2008

* cited by examiner

*Primary Examiner* — Yonas Bayou
(74) *Attorney, Agent, or Firm* — Mannava & Kang, P.C.

(57) ABSTRACT

A network security system detects anomalous network device behavior associated with a network device in a group of similar network devices based on baseline network device behavior determined for the group. A graphical visualization may be generated to analyze the groups.

17 Claims, 7 Drawing Sheets

NETWORK SECURITY

BACKGROUND

Network security has become increasingly important in today's society. In particular, the ability to effectively protect computers and systems presents a significant obstacle for component manufacturers, system designers, and network administrators. This obstacle is made even more difficult due to the plethora of new security threats, which seem to evolve daily.

Furthermore, networks and enterprise systems are becoming increasingly dispersed and complex. From a network management perspective, this means that network devices are increasingly more difficult to keep track of and manage from a centralized location. In addition, computers and other network devices are now equipped with added capabilities such as built-in firewalls and Network Address Translation (NAT), which allows for unmanaged security settings on a device that is hooked up to a network.

For example, in an enterprise environment, network managers typically try to keep workstations and other network devices updated and protected by one or more various anti-virus capabilities that are available. However, viruses and worms on un-managed computers crop up, typically because the infected device has gained access to the network in an unauthorized manner, because the device is "stealthing" or hiding on the network, or because the device simply isn't configured properly. In another example, hackers may try to gain unauthorized access to a network through brute force attacks. Due to the many types of attacks and the large number of devices that may be connected to a network it can be difficult to manage and detect network security threats.

BRIEF DESCRIPTION OF DRAWINGS

The embodiments are described in detail in the following description with reference to the following figures. The figures illustrate examples of the embodiments.

DETAILED DESCRIPTION OF EMBODIMENTS

For simplicity and illustrative purposes, the principles of the embodiments are described by referring mainly to examples thereof. In the following description, numerous specific details are set forth in order to provide a thorough understanding of the embodiments. It is apparent that the embodiments may be practiced without limitation to all the specific details. Furthermore, the embodiments may be used together in various combinations.

As described in the embodiments and examples herein, a network security system is able to capture event information regarding events occurring at network devices and may determine groups of similar network devices based on the captured event information. A baseline network device behavior for each group may be determined from event information captured for network devices in the group, and compared to network device behavior for network devices within the group to detect anomalous network device behavior that may be indicative of a network security threats. Corrective actions may be performed at the network devices to quarantine or stop the network threats. Also, the network security system can generate and display graphical visualizations of the groups of network devices to provide a visual analysis of network devices in the groups and for determining similar attributes of devices in a group to identify network threats.

The network security system may be able to group network devices generally without any a priori knowledge of how to form the groups, and network device behavior within the groups, such as events and configurations of the network devices within the group, is analyzed to detect potential network threats, such as an attempt to gain unauthorized access to a network or network device. The network security system can help a network administration identify network device groupings that may not be intuitive or easily discernable but yet may be beneficial for identifying network security threats.

Also, the graphical visualizations of the groups generated by the network security system can be helpful to a network administration for visually examining the inter-relationships between network devices through time. The graphical visualizations may dynamically depict network device similarities across time, thus visualizing the level of systemic risk in the network at any given point. This advanced risk analytics visualization provides the ability to visually examine the level of similarities between network devices and how that interrelationship changes through time, based on different attributes or variables describing the network devices.

Figure 1:
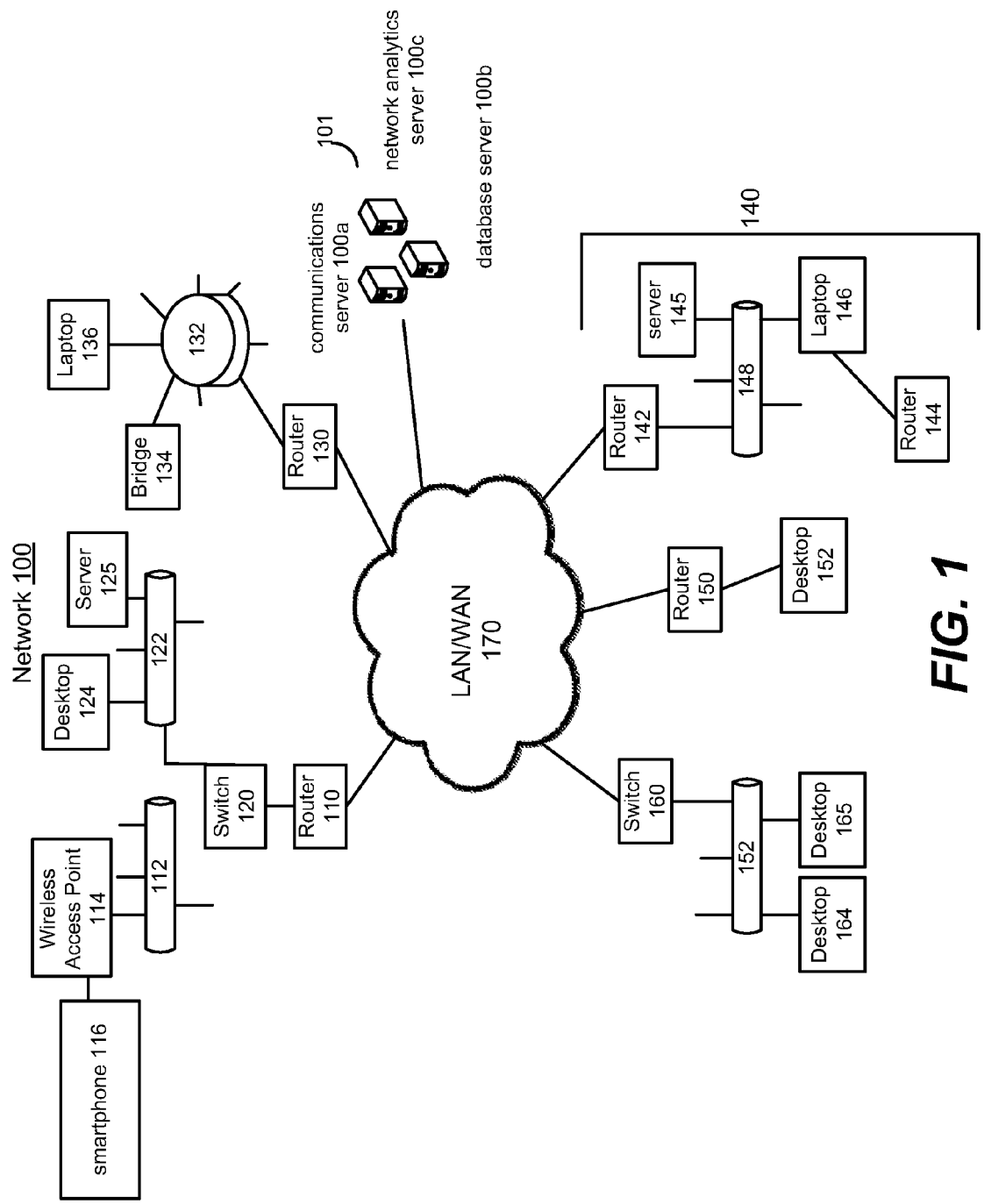
FIG. 1 illustrates a network security system and network devices connected to a network, according to an embodiment.

Network 100 may have a number of routers 110, 130, 142, 144, and 150 attached to it, as well as a number of switches 120 and 160. The network 100 may include a Local Area Network (LAN) 170 with discrete subnets or it may include multiple LANS, such as network 140 separated by a Wide Area Network (WAN) 170. FIG. 1 is a simplified example of an expansive and complex enterprise network with examples of the multiple types of devices that may be utilized.

A network security system 101, for example, is able to capture event information for network devices and identify network devices that may be a network security threat. A network device is any device that is in or may be connected to a network. Examples of network devices are shown in FIG. 1 and may include but are not limited to smartphone 116, laptops 136 and 146, desktops 124, 152 and 164, wireless access point 114, network bridge 134, gaming device 166, servers 125 and 145, routers 110, 130, 142, 144, and 150, switches 120 and 160 and firewalls. It should be understood that FIG. 1 is for illustrative purposes only and does not depict the entire range of network equipment or network infrastructures that may be relevant in practicing the present invention. It will be further appreciated that network connections for the network devices may be established through any suitable interface and protocols, such as TCP/IP, Frame Relay, Ethernet, FTP, HTTP and the like, is presumed. Also, it will be apparent that the network 100 may include network devices and network configurations other than shown.

In an example, the network security system 101 may include communications server 100a, database server 100b, and network analytics server 100c. Each server may include one or more processors, memory and other data storage to store software applications and data to perform its functions. The network security system 101 in other examples may include computer systems other than servers, or the network security system 101 may execute applications or functions for the servers 100a-c on a single computer system or server or on multiple computer systems or servers.

The communications server 100a may interface with the network devices to capture event information from the network devices. Event information may include any configuration information of network devices and information describing events occurring at network devices. The event information may include variables to describe this information and the variables may include attributes of the network devices or attributes of events occurring at the network devices. The event information may be logged and stored at the network devices, and transmitted to the network security system 101. The event information may be used for determining similar network devices and grouping network devices. The event information may be captured directly from the network devices, such as by sending requests to the network devices, or may be captured from a remote server storing the event information, which may be captured and stored in the remoter server by another system.

The communications server 100a may include one or more interfaces, such as a web server, application program interfaces, etc., that facilitate receiving data from the network devices. The communications server 100a may execute any suitable communication applications to retrieve network information from the network devices. Many network devices are managed via Simple Network Management Protocol (SNMP). The network security system may capture some event information through SNMP.

The database server 100b stores the captured event information. The database server 100b may include SQL server or another type of database front-end to execute queries and perform other database management functions on stored data. The network analytics server 100c may determine similarities between network devices and groups of similar network devices based on the captured event information. The analytics server 100c may be able to detect network security threats based on the groups and facilitate corrective actions to quarantine or stop the network security threats. Also, the network analytics server 100c can generate and display graphical visualizations of the groups of network devices to provide a visual analysis of network devices in the groups and for determining similar attributes of devices in a group.

Figure 2:
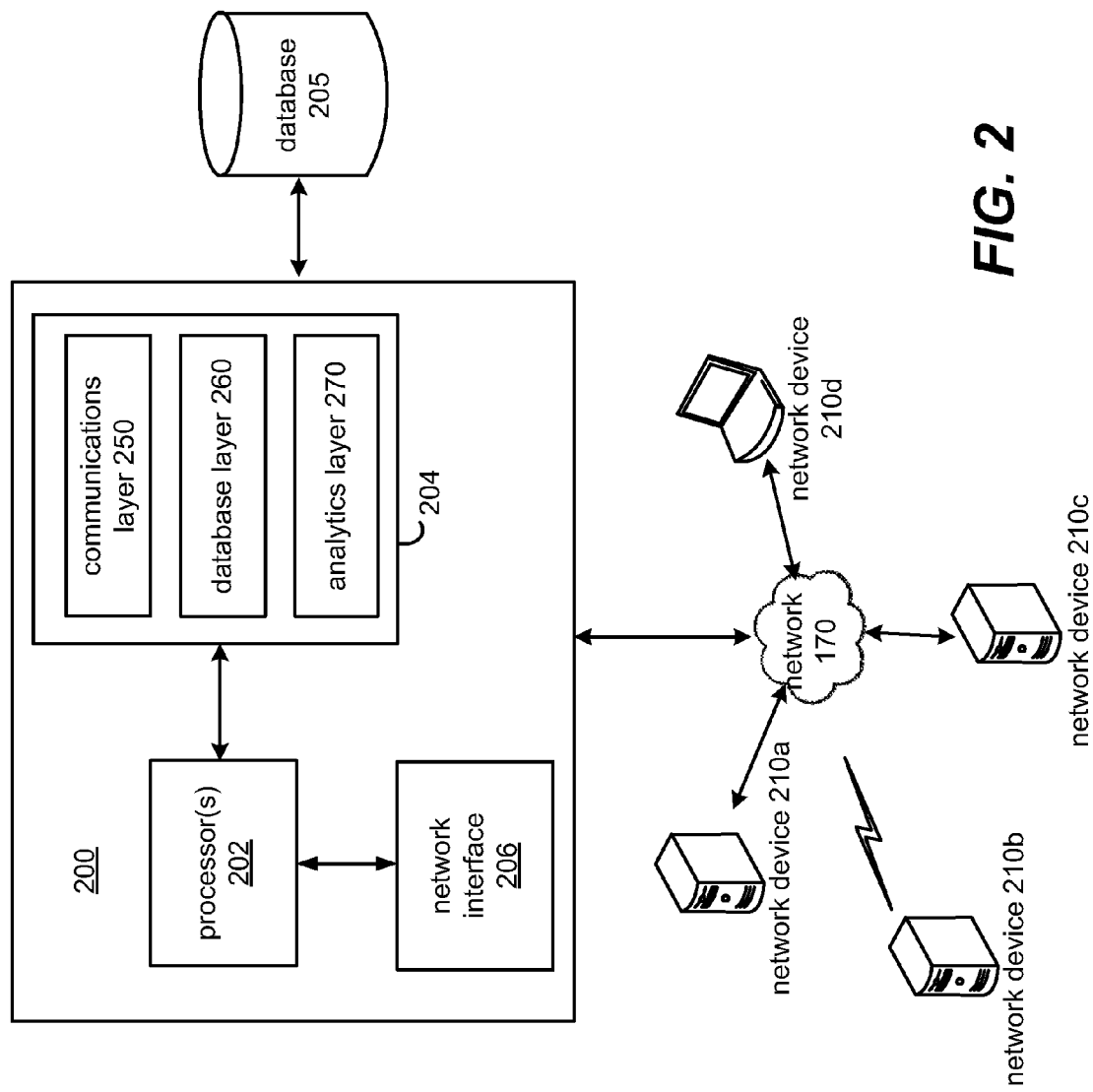
FIG. 2 illustrates a hardware platform for the network security system, according to an embodiment.

FIG. 2 shows an example of a specialized computer platform 200 for the network security system 101. The computer platform 200 may be used for one or more of the servers 100a-c for the. For example, the platform 200 may be a server or another computer and includes, for example, processor(s) 202, a data storage device 204, and a network interface 206. Also, the components are shown in a single computer as an example and in other examples the components may exist on multiple computers and the components may comprise multiple processors, data storage devices, interfaces, etc. For example, the components, such as layers 250-270, may be provided on respective servers 100a-c.

The data storage 204 may include a hard disk, memory, or any type of non-transitory computer readable medium. The data storage 204 may store any data used by the network security system 101. The processor 202 may be a microprocessor, a micro-controller, an application specific integrated circuit (ASIC), field programmable gate array (FPGA), or other type of circuit to perform various processing functions.

The data storage 204 may store machine readable instructions executed by the processor 202 to perform the operations of the network security system 101. The layers 250-270 may be comprised of the machine readable instructions. For example, the communications layer 250 may be comprised of communications applications for extracting data from the data sources 101. The communications applications may include a web server application, a portal application, SNMP application, etc.

The database layer 260 performs database operations for event information captured from the network devices 210 and stored in the database 205. The network devices 210 may include any of the network devices shown in FIG. 1. Additionally, the database layer 260 may include SQL server or another type of database front-end to execute queries and perform other database management functions. The analytics layer 270 determine similarities between the network devices 210 and groups of similar network devices, and detects network security threats based on the groups, and generates the graphic graphical visualizations of the groups. The network interface 206 comprises hardware and/or a software. The network interface 206 for example connects the network security system 101 to the network 170 which may include the Internet, a LAN, etc. Also, users, such as network administrators may connect to the computer platform 200 via the network interface 206. The users may view the graphical visualizations of the groups and provide user input for analyzing the groups and potential network security threats. The computer platform 200 may include I/O devices, not shown, such as keyboard, display, etc., for receiving user input and displaying information, including graphical visualizations.

Figure 3:
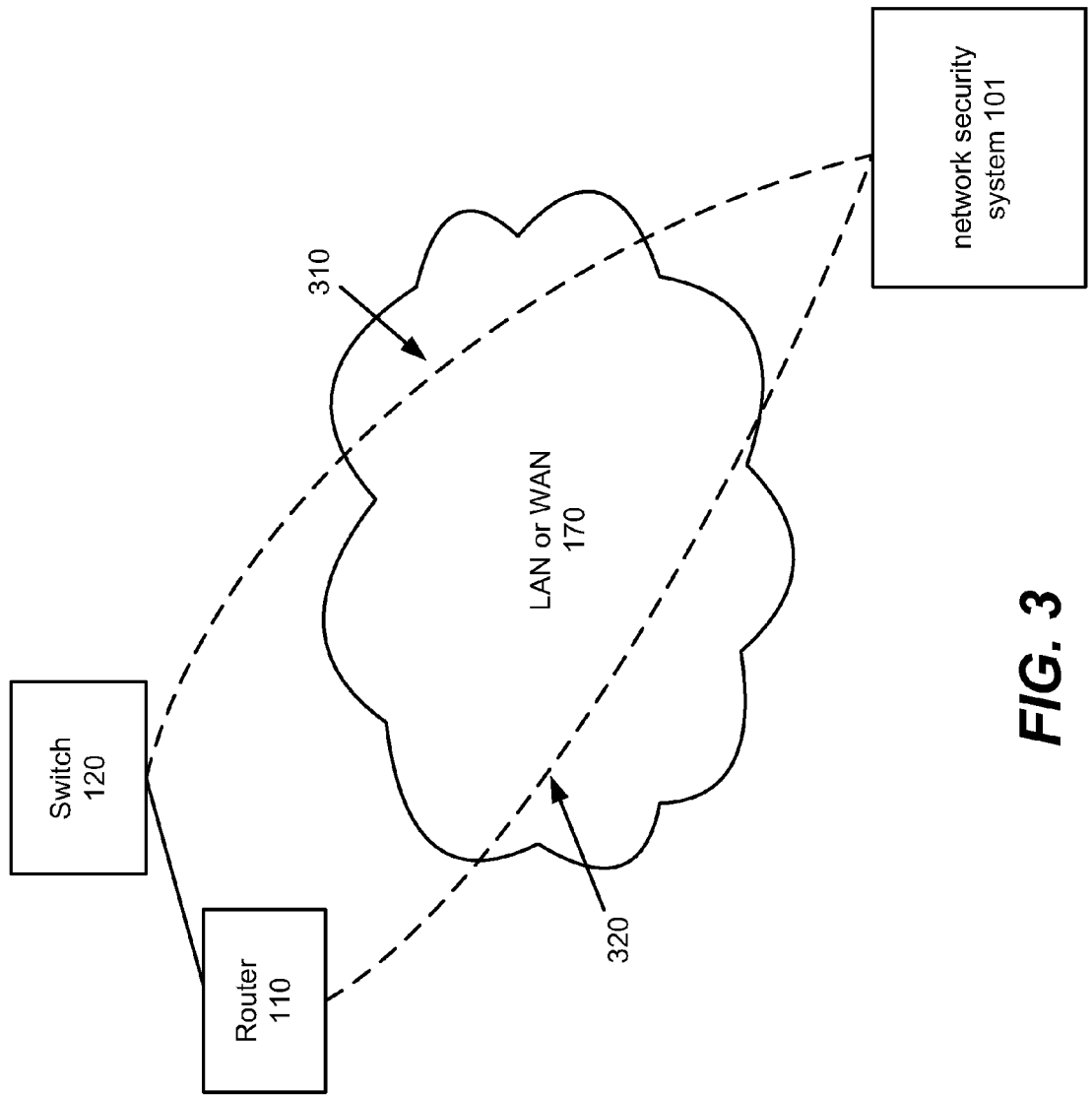
FIG. 3 illustrates the network security system communicating with network devices, according to an embodiment.

FIG. 3 depicts an example of the network security system 101 communicating with one or more network devices. For example, the network security system 101 communicates with router 110 and switch 120 via network 170 to capture event information from these network devices. The network security system 101 may connect to network routers and switches remotely over a WAN such as the public Internet, or may connect locally over a LAN. Also, the network security system 101 may connect remotely with end user network devices connected to the network 170 to capture event information. The network devices may store an SNMP agent that allows the network security system 101 to retrieve event information from the network devices. In other examples, telnet or a secure shell may be used to retrieve event information from the network devices. Passive and active techniques may be used to capture event information. SNMP polling may be used.

Figure 4:
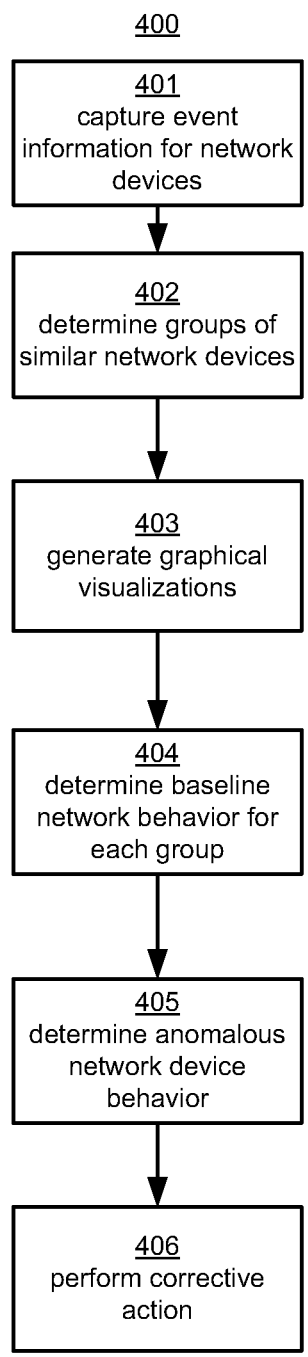
FIG. 4 illustrates a flow chart of a method for determining anomalous network device behavior, according to an embodiment.

FIG. 4 shows a method 400 for detecting network security threats, according to an embodiment. The method 400 and other methods described below are described by way of example with respect to being performed by the network security system 101 shown in FIGS. 1-3. Also, one or more of the steps of the methods described below may be performed in the order shown or in other orders or substantially simultaneously.

At 401, the network security system 101 captures event information for the network devices. The event information for example comprises variables describing events and configuration information for the network devices. The events may include actions performed at the network devices. The events may be operations performed at the network devices that are logged by the network devices, such as logins, packet transmission or packet receiving, establishing or termination connections, re-configurations or re-booting, etc. The variables may include device type, geographic location, privileges, variables describing the events, etc.

At 402, groups of similar network devices based on the captured event information are determined. The groups may be determined based on bucketing of events based on N dimensions or N variables where N is an integer greater than 1, and network device similarities determined from the bucketing. The determining of the groups is further described below with respect to method 500.

At 403, graphical visualizations of the groups are generated and displayed. The graphical visualizations may dynamically depict network device similarity across time or other dimensions, thus visualizing the level of systemic risk in the network at any given point of the dimensions. Also, the graphical visualizations may be used to determine the groups based on clusters visually depicted in the graphical visualizations. The graphical visualizations facilitate advanced risk analytics visualization to determine how similar network device are and how that interrelationship changes through time, based on different attributes or variables describing the network devices. The graphical visualizations are further described below.

At 404, a baseline network behavior is determined for each group. For example, a subset of the variables are selected that may be indicative of network device behavior within the group. For example, the variables for each network device are analyzed to identify variables that have similar values or are within a similar range or standard deviation of each other. Averages may be determined for each of these variables and maybe used as the baseline network behavior for the group.

At block 405, anomalous network device behavior is determined for network devices in each group. For example, each network device's behavior is compared to the network device baseline behavior. For example, the variables used in the baseline are identified. The values for those variables for the network device are determined and compared to the baselines, such as the averages, to determine whether they deviate from the baseline variables by a predetermined amount. If yes, the network device may be considered to have anomalous network device behavior. For example, if a network device has two times the number of logins of the average number of logins of the other members of the group and the logins are from users that do not match the typically profile of the other member's users, then the network device is considered to have anomalous network device behavior.

At 406, corrective actions are taken for the anomalous network device behavior, such as generating alerts, disconnecting the network device from the network, shutting down the network device, re-configuring the network device, etc.

Figure 5:
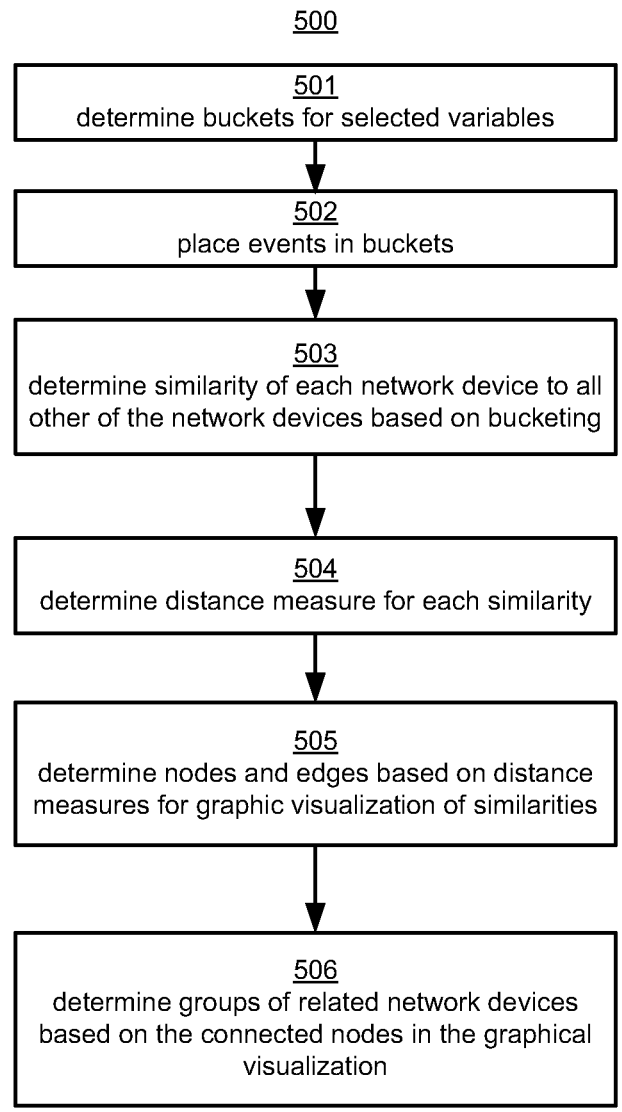
FIG. 5 illustrates a flow chart of a method for grouping similar network devices, according to an embodiment.

FIG. 5 shows a method 500 for determining groups of similar network devices. The method 500 may be performed for step 402 of the method 400.

Figure 6:
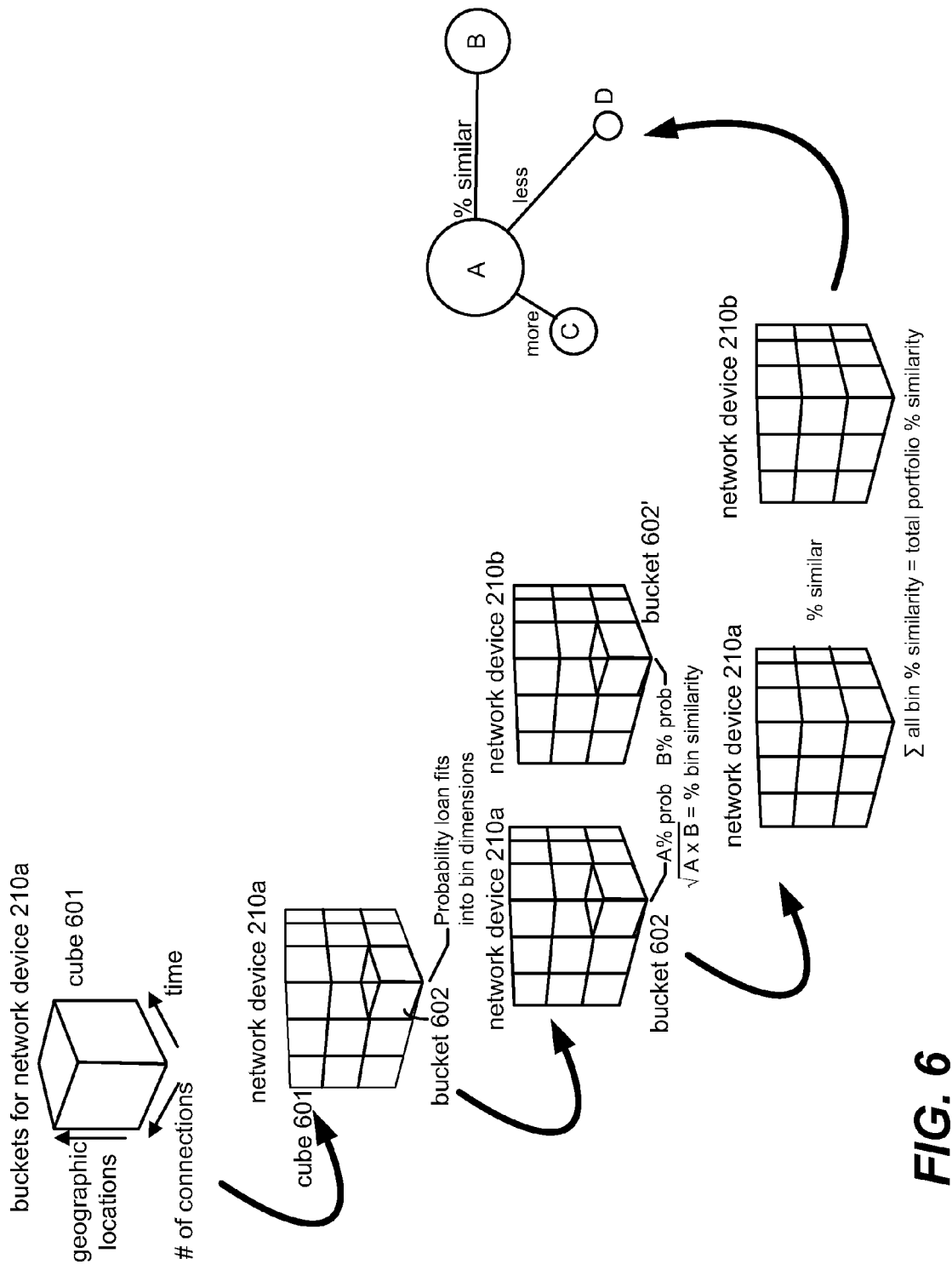
FIG. 6 illustrates grouping of entities, according to an embodiment.

At 501, buckets are determined for selected variables used to describe the event information. Variables, also referred to as dimensions, of the captured event information are selected for bucketing. The variables are divided among the buckets. For example, each bucket is assigned a variable value or set of variable values for each selected variable. FIG. 6 shows an example of buckets for three selected variables. The cube 601 represents all the buckets and the cube is subdivided into the buckets. In this example, the three selected variables are geographic location of network device, number of successful logins, and time. Each bucket may represent one or more variable values for each variable. For example, the highlighted bucket 602 may represent a particular geographic location X, 0-5 successful logins, and time period 0:00-0:15 in a day. Other buckets may be for different regions, different time periods and different number of successful logins. The variables may be selected by a user and also the subdivision of each variable for the buckets may be selected by a user. FIG. 6 shows the determination of network device similarities and is referred to with respect to the steps of FIG. 5.

Other examples of variables that may be captured by the network security system 101 and may be selected for bucketing including but not limited to number of unsuccessful logins, number of incidents, number of viruses blocked, number of patches applied, number of spam blocked, number of virus infections, number of port probes, password strength, metrics for network traffic, number of TCP/IP connections, management information base (MIB) variables, packet size, source and destination addresses; DNS information, user privileges of users logging into a network device, user role, device type, operating system, etc. Also, 3 variables are shown in FIG. 6 but N number of variables may be selected where N is an integer greater than 1.

At 502, events for which the event information is captured are placed in the corresponding buckets. For example, an event may be an unsuccessful login or a terminated network connection at the network device. The event is placed in its corresponding bucket for example depending on when it took place, where it took place and number of successful logins occurring in the time period for the network device. In an example, a probability is determined for whether the events falls into a particular bucket. This is referred to as the bucket probability. For example, a total number of events for the network device are determined. The number of events determined or estimated to be in the bucket is divided by the total number events of the network device, such as for a given time period, is the event probability in this example.

At 503, a similarity of each network device to all other of the network devices is determined based on the bucketing. A similarity index may be created including the similarities between the network devices, and indicates how similarities between network devices across all buckets for the selected variables.

For example, the similarity of each corresponding bucket for each network device is determined. FIG. 6 shows an example of comparing corresponding buckets for network devices 210a-b. For example, bucket 602 and 602' are corresponding buckets because they represent the same bucket (e.g., same geographic location X, 0-5 successful logins, and time period 0:00-0:15) for each of the network devices 210a-b. The bucket similarity between corresponding buckets for example is the square root of the product of the probabilities for each bucket determined at 503, such as $\sqrt{A*B}$, where A is the bucket probability for bucket 602 and B is the bucket probability for bucket 602'. The similarity between two network devices for example is the sum of all the bucket similarities for corresponding buckets, which may be determined according to the Bhattacharrya coefficient. The Bhattacharrya coefficient is a measure of an overlap between two statistical samples and can be used to represent degree of similarity. The similarity of each network device to all other of the network devices may be determined for network devices of the same type. For example, end user devices are compared with each other, routers are compared with each other, firewalls are compared with each other, servers are compared with each other, etc.

At 504, a distance measure is determined from each similarity determined at 503. The distance measure represents the similarity between network devices and may be used to generate the graphical visualization of the similarities. For example, 1−(1/similarity) is the distance between nodes, and each node represents a network device. For example, if two network devices are 100% similar the distance measure is 0, and if two network devices have a 0% similarity, the distance measure is 1. Accordingly, a similarity between 0% and 100% has a distance measure between 0 and 1. In an example, the Bhattacharyya distance may be used as a distance measure. The Bhattacharyya distance is a known statistical measure that measures the similarity of two discrete or continuous probability distributions.

At 505, nodes and edges are determined based on distance measures and may be used for generating a graphical visualization of the similarities. For example, each network device is represented by a node, and an edge connecting the nodes has a length or value based on the distance measure determined at 504. For example, 1/distance measure is the edge value, such as 1/0.5=2 units apart (i.e., 2 is the edge value). The smaller the edge value (i.e., the shorter the edge), the more similar the network devices. FIG. 6 shows an example of the nodes and edges. Network devices represented by nodes A and C are more similar than network devices represented by nodes A and D or nodes A and B because their edge lengths are longer than the A-C edge length. Node size may represent number of events.

At 506, groups of related network devices are determined based on the connected nodes in the graphical visualization. For example, a spanning tree function is executed to determine the groups. The spanning tree function naturally forms clusters based on how close the nodes are (e.g., edge lengths). A spanning tree T of an undirected graph G is a subgraph that includes all of the vertices of G that is a tree. For example, a tree is a connected undirected graph with no cycles. The tree is a spanning tree of a graph G if it spans G (that is, it includes every vertex of G) and is a subgraph of G (every edge in the tree belongs to G). The spanning tree of the connected graph G may also be defined as a maximal set of edges of G that contains no cycle, or as a minimal set of edges that connect all the vertices. By way of example, a depth-first search or a breadth-first search may be performed to generate the spanning tree. The spanning tree function may be a minimum spanning tree function may be generated to identify the clusters.

Figure 7:
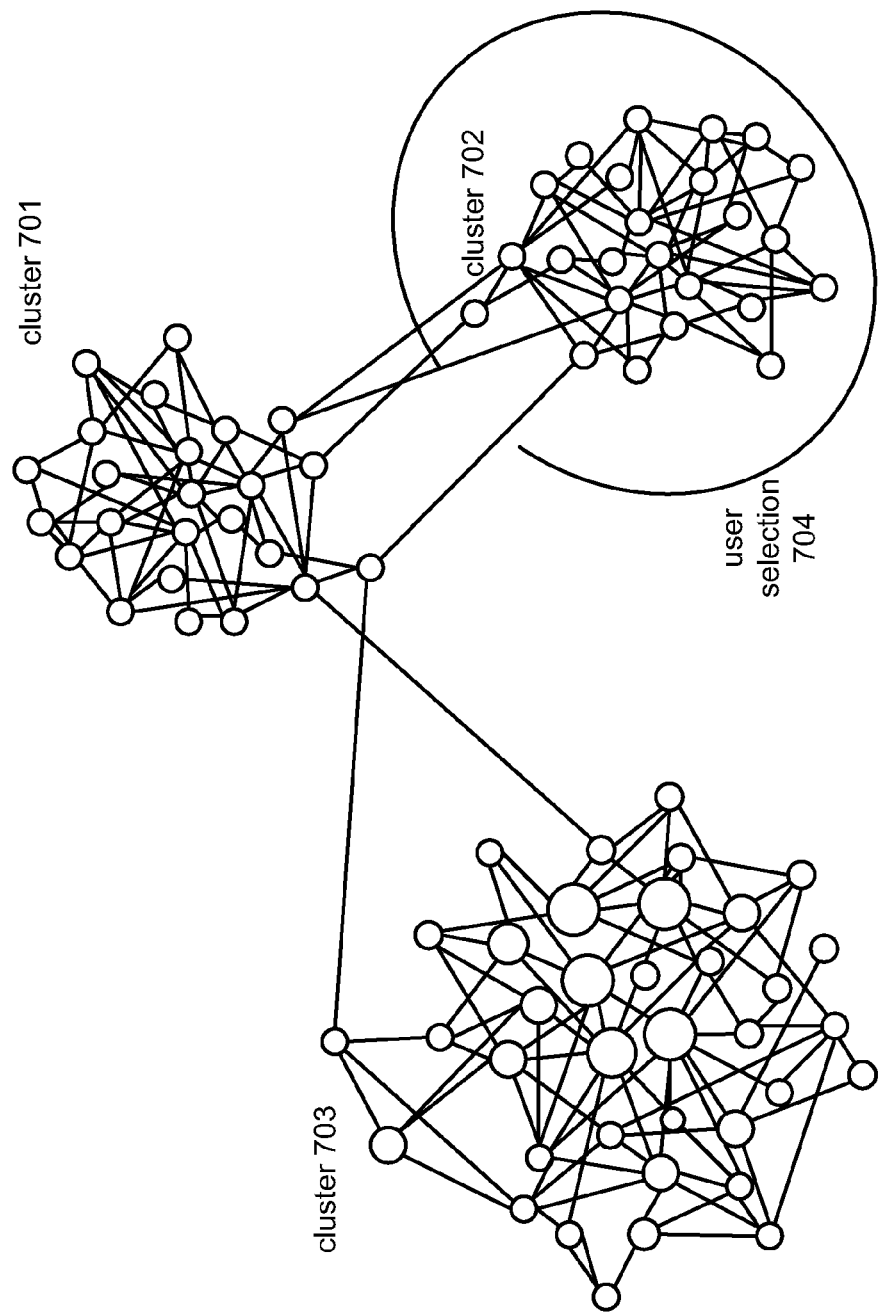
FIG. 7 illustrates an example of a graphical visualization, according to an embodiment.

FIG. 7 shows an example of a graphical visualization of the spanning tree that may be generated by the network security system 101. Clusters 701-703 are formed. Each cluster represents a group of the network devices that may be analyzed to determine anomalous behavior that may be indicative of a network security threat. Also, through a user interface, a user may select nodes in the cluster that are to be included in a group. For example, shown as 704, a user may encircle nodes that are desired to be included in a group, and the group is created with those nosed. Information of which nodes belong to each group is stored by the network security system 101, so the network devices can be analyzed within the context of their group. Also, the network security system 101 may automatically identify nodes in a group based on how close they are to each other, and a user may modify the groups as desired. Once the clusters are shown in the graphical visualization, the clusters may be further analyzed through the graphical visualization to determine interrelationships between the network devices. For example, through a user interface different dimensions may be selected and nodes falling within the dimension may be highlighted in the graphical visualization to determine whether a dimension or variable should be used as a factor for determining network security threats.

The methods, systems and functions described herein may be used for detecting anomalies for any data objects. For example, any data that has multiple variables, and multiple values for each variable can be analyzed as discussed herein. Also, any type entities may be grouped according to the similarities of their events. An entity for example may be a device, a person or an organization. In an example, entities are lenders and event information regarding loans given by the lenders is stored. The event information may be described by variables related to loans, such as Debt-To-Income (DTI), Loan-to-Value (LTV), and FICO scores. For example, buckets are generated for these variables and each bucket includes a range of values for the variables which may be non-overlapping. Similarities between the lenders is determined according to the bucketing, and the methods described above. A graphical visualization may be generated based on the similarities and for determining the groups of related lenders to identify anomalous loan behavior.

While the embodiments have been described with reference to examples, those skilled in the art will be able to make various modifications to the described embodiments without departing from the scope of the claimed embodiments.

What is claimed is:

1. A network security system comprising:
a communications server including a network interface to receive event information from a plurality of network devices, wherein the event information comprises variables describing events associated with actions occurring at the network devices;
a database server including at least one storage device to store the event information;
a network analytics server including at least one hardware processor to:
determine groups of similar network devices based on the captured event information, wherein to determine the groups, the hardware processor is to:
determine buckets for each of the variables;
bucket the events by placing the events in at least one of the buckets based on a subset of the variables;
determine a similarity of each network device to all other of the network devices based on the bucketing, wherein to determine the similarity of each network device to all other of the network devices, the hardware processor is to:
determine a bucket probability for each bucket;
determine a similarity of corresponding buckets for the network devices based on the bucket probabilities of the corresponding buckets; and
determine the similarity of each network device to all other of the network devices based on the similarity of the corresponding buckets; and
generate the groups of similar network devices based on a similarity of each network device to all other of the network devices; and
detect anomalous network device behavior associated with at least one of the network devices in a group of the groups of similar network devices based on baseline network device behavior determined for the group.

2. The network security system of claim 1, wherein to generate the groups, the network analytics server is to:
determine, for each network device, a distance measure from the similarities of the network device to all other of the network devices;

generate a graph based on the distance measures;
determine a minimum spanning tree from the graph; and
determine the groups from the minimum spanning tree.

3. The network security system of claim 2, wherein the network analytics server is to generate a graphical visualization of the minimum spanning tree.

4. The network security system of claim 3, wherein the graphical visualization comprises nodes representing the network devices and edges representing the similarities between the network devices, wherein a length of each edge indicates a degree of similarity between network devices represented by nodes connected to the edge.

5. The network security system of claim 1, wherein the similarity of corresponding buckets are summed across all buckets to determine the similarity of each network device to all other of the network devices.

6. The network security system of claim 1, wherein the network analytics server is to perform a corrective action at the network device with the anomalous network device behavior.

7. The network security system of claim 6, wherein the corrective action comprises generating an alert message or performing an action at the network device.

8. The network security system of claim 1, wherein the communications server is to poll plurality of the network devices for the event information.

9. The network security system of claim 1, wherein the event information for a network device comprises information describing at least a configuration of the network device and an action performed at the network device.

10. A system to identify anomalous data objects of captured event information, the system comprising:
a data storage device to store events and variables describing the events, wherein the events are associated with entities;
a processor to:
  determine groups of the entities, wherein to determine the groups the processor is to:
    determine buckets for each variable in a subset of the variables;
    bucket the events by placing the events in at least one of the buckets based on the subset of variables;
    determine a similarity of each entity of the entities to all other of the entities based on the bucketing, wherein to determine the similarity of each entry, the processor is to:
      determine a bucket probability for each bucket;
      determine a similarity of corresponding buckets based on the bucket probabilities of the corresponding buckets; and
      determine the similarity of each entity to all other of the entities based on the similarity of corresponding buckets; and
    generate the groups based on the similarity of each entity to all other of the entities; and
  detect an anomalous event associated with an entity in a group based on a baseline determined for events associated with the group.

11. The system of claim 10, comprising:
a display, and the processor is to generate a graphical visualization of the entities based on the similarities of the entities.

12. The system of claim 11, wherein the graphical visualization comprises nodes representing the entities and edges representing the similarities between the entities, and wherein a length of each edge of the edges indicates a degree of similarity between entities represented by the nodes connected to the edge.

13. The system of claim 10, wherein to generate the groups, the processor is to:
determine, for each entity, a distance measure from the similarities of the entity to all other of the entities;
generate a graph based on the distance measures;
determine a minimum spanning tree from the graph; and
determine the groups from the minimum spanning tree.

14. A network security method comprising:
storing, in a storage device, event information from a plurality of network devices, wherein the event information comprises variables describing events associated with actions occurring at the network devices;
determining, by a processor, groups of similar network devices based on the stored event information, wherein determining the groups includes:
  determining buckets for each of the variables;
  bucketing the events, wherein the bucketing includes placing the events in at least one of the buckets based on a subset of the variables;
  determining a similarity of each network device to all other of the network devices based on the bucketing by:
    determining a bucket probability for each bucket;
    determining a similarity of corresponding buckets based on the bucket probabilities of the corresponding buckets; and
    determining the similarity of each network device to all other of the network devices based on the similarity of the corresponding buckets; and
  generating the groups of similar network devices based on the similarity of each network device to all other of the network devices; and
detecting anomalous network device behavior associated with at least one of the network devices in a group of the groups of similar network devices based on baseline network device behavior determined for the group.

15. The method of claim 14, comprising:
generating a graphical visualization of the network devices based on their similarities.

16. The method of claim 15, wherein the graphical visualization comprises nodes representing the entities and edges representing the similarities between the entities, wherein a length of each edge indicates a degree of similarity between entities represented by nodes connected to the edge.

17. The method of claim 14, wherein generating the groups comprises:
determine, for each network device, a distance measure from the similarities of the network device to all other of the network devices;
generate a graph based on the distance measures;
determine a minimum spanning tree from the graph; and
determine the groups from the minimum spanning tree.

* * * * *